United States Patent [19]

Rockenfeller et al.

[11] Patent Number: 5,390,509
[45] Date of Patent: Feb. 21, 1995

[54] TRIPLE EFFECT ABSORPTION CYCLE APPARATUS

[75] Inventors: Uwe Rockenfeller; Paul Sarkisian, both of Boulder City, Nev.

[73] Assignee: Rocky Research, Boulder City, Nev.

[21] Appl. No.: 130,007

[22] Filed: Sep. 30, 1993

Related U.S. Application Data

[63] Continuation-in-part of Ser. No. 47,625, Apr. 14, 1993, Pat. No. 5,335,515, which is a continuation of Ser. No. 800,636, Nov. 27, 1991, abandoned.

[51] Int. Cl.$^6$ .............................. F25B 15/00
[52] U.S. Cl. .............................. 62/476; 62/112
[58] Field of Search ............. 62/476, 497, 112, 335

[56] References Cited

U.S. PATENT DOCUMENTS

| | | | |
|---|---|---|---|
| 3,316,728 | 5/1967 | Biermann | 62/112 |
| 3,452,550 | 7/1969 | Dyre | 62/85 |
| 3,541,013 | 11/1970 | Macriss | 252/69 |
| 3,593,540 | 7/1971 | Hopkins | 62/476 |
| 3,742,728 | 7/1973 | Mamiya | 62/476 |
| 3,783,631 | 1/1974 | Modahl | 62/112 |
| 3,928,983 | 12/1975 | Ainbinder | 62/101 |
| 3,949,566 | 4/1976 | Hopkins | 62/475 |
| 3,977,204 | 8/1976 | Bourne | 62/85 |
| 4,315,411 | 2/1982 | Vardi | 62/112 |
| 4,333,515 | 6/1982 | Wilkinson | 165/1 |
| 4,520,634 | 6/1985 | Oouchi et al. | 62/476 |
| 4,531,374 | 7/1985 | Alefeld | 62/79 |
| 4,542,628 | 9/1985 | Sarkisian et al. | 62/335 |
| 4,542,629 | 9/1985 | Biermann | 62/476 |
| 4,551,991 | 11/1985 | Miyoshi et al. | 62/476 |
| 4,637,218 | 1/1987 | Tchernev | 62/476 |
| 4,732,008 | 3/1988 | De Vault | 62/79 |
| 4,827,728 | 5/1989 | DeVault et al. | 62/79 |
| 4,921,515 | 5/1990 | Dao | 62/335 |
| 5,033,274 | 7/1991 | Erickson | 62/476 |
| 5,205,136 | 4/1993 | DeVault et al. | 62/476 |
| 5,284,029 | 2/1994 | Keuper et al. | 62/476 |

FOREIGN PATENT DOCUMENTS

| | | |
|---|---|---|
| 278076 | 9/1914 | Germany . |
| 1208467 | 10/1970 | United Kingdom . |
| 9012848 | 11/1990 | WIPO . |

*Primary Examiner*—Henry A. Bennet
*Assistant Examiner*—William C. Doerrler
*Attorney, Agent, or Firm*—Jerry R. Seiler

[57] ABSTRACT

The basic apparatus of the invention is a triple effect absorption cycle apparatus, comprising first, second and third generators each containing an aqueous absorption fluid and operating at successively higher temperatures; first, second and third condensers operating at successively higher temperatures, and operatively communicating with the generators; first heat exchange means cooperating between the third and second generators, and between the second condenser and first generator, for directing energy therebetween; one, two or three absorbers and one, two or three fluid loops for directing aqueous absorption fluid between absorbers and second heat exchange means for exchanging energy between aqueous absorption fluid flows in said loops; and one, two or three evaporators operatively communicating with the absorbers. The invention includes preferred aqueous absorption fluids, a heat and mass transfer additive in the absorption fluid, means for separating the additive before the fluid reaches the high temperature generator, a heat and mass transfer reservoir, and a number of different absorption fluid loop options for routing the fluid between the absorber(s) and the three generators.

63 Claims, 5 Drawing Sheets

TRIPLE EFFECT ABSORPTION CYCLE APPARATUS

This application is a continuation-in-part of application Ser. No. 08/047,625, filed Apr. 14, 1993, now U.S. Pat. No. 5,335,515, issued Aug. 9, 1994, which is a continuation of Ser. No. 07/800,636, filed Nov. 27, 1991, now abandoned.

Concerns about the environmental impact of fluorocarbons and hydrofluorocarbons on the environment call for expanded uses of environmentally sound refrigerants, such as water or ammonia. For commercial chiller applications in the capacity range of 15–10,000 refrigeration tons with little heating requirements, water is usually the preferred refrigerant due to its non-flammable and benign nature.

Aqueous absorption fluid cycles taking advantage of such refrigerants have been known and used for many decades. Single effect and various two-stage designs are commercially used in many countries. However, the increasing concern about the overall $CO_2$ generation in the process of converting fossil fuels into energy used for air conditioning or refrigeration calls for higher energy conversion efficiencies than currently obtained with single stage (COP=0.6 to 0.8) or two-stage (COP=0.9 to 1.25) absorption equipment.

U.S. Pat. No. 4,732,008 teaches the use of two single stage cycles coupled to achieve three refrigeration effects. The independent loops carry different absorption fluids with the lower stage using fluids such as aqueous LiBr solutions. However, the needed upper stage fluid crystallization and vapor pressure suppression properties require the use of a different fluid. Performance estimates lead to COPs of 1.5 to 1.7 if suitable upper stage fluids are used.

SUMMARY OF THE INVENTION

The present invention is for an apparatus having three refrigeration effects in which either a single aqueous absorption fluid or two or three different absorbents or different absorbent concentrations with a single refrigerant, i.e. water, are used throughout the system. Thus, because such a single refrigerant, water, is used as the refrigerant or working fluid solvent throughout the system, regardless of the stage, the invention offers a substantial improvement over prior art triple effect systems which rely solely on heat transfer coupling of three heat exchangers with no common mass flows. The apparatus and systems of the invention result in COPs similar to those used in the aforesaid two single stage cycle triple effect apparatus. However, because peak operating temperatures are lower than in such a dual loop system, the temperature lift and fluid crystallization requirements of the fluid composition in the third stage generator are reduced.

In our aforesaid co-pending application, the triple effect systems disclosed incorporating three generators and three condensers with one or more fluid loops for directing aqueous absorption fluid between one, two or three absorbers and any one or more of the first, second and third generators, use both series and parallel fluid loop configurations. The descriptions of the various systems, components and fluids disclosed in the aforesaid application are incorporated herein by reference. The present invention describes systems incorporating specific combinations of different parallel, series, and reverse flow fluid loops for achieving advantages, such as avoiding high absorbent concentrations leading to potential crystallization.

In another embodiment herein, a specific system is illustrated in which the components of the highest stage loop are in heat transfer communication only with the remaining lower stage components of the three stage apparatus.

DETAILED DESCRIPTION OF THE INVENTION

In our aforesaid previous application, incorporated herein by reference, there are shown phase diagrams illustrating the triple effect absorption cycles of the invention utilizing apparatus shown schematically in the drawings herein having three generators, high temperature generator, $G_3$, medium temperature generator, $G_2$, and low temperature generator, $G_1$, respectively, and high, medium and low temperature condensers, $C_3$, $C_2$, and $C_1$, respectively. Firing temperatures FT are typically between about 400° F. and 520° F. and minimally between about 390° F. and 420° F. In such apparatus, a high temperature, third stage generator $G_3$ is used to generate water vapor of sufficient pressure and temperature to condense water refrigerant such that the heat of condensation can be used to drive the medium stage generator $G_2$, which in turn generates vapor to be condensed at sufficient temperature to drive the lower, first stage generator $G_1$, which in turn generates refrigerant vapor which is condensed with conventional cooling and heat rejection means. The heat exchange between condenser $C_3$ and generator $G_2$ can be achieved with phase change heat transfer using an appropriate phase change heat transfer fluid capable of operating in the approximate temperature range of 300° F. to 400° F. Alternatively, a pumped loop of heat exchange fluid for sensible heat transfer may be used. Similarly, heat exchange between condenser $C_2$ and generator $G_1$ may be achieved with either a phase change heat transfer in the approximate temperature range of about 150° F. and 275° F. or by a pumped loop for a heat exchange fluid. The aforesaid temperature ranges are approximate, and will depend on the thermal load on the equipment, as well as ambient reject temperatures which change during the day as Well as the season. Typical reject temperature equipment designs are in the range of 70° F. to 95° F. for water cooled equipment, and approximately 25° F. higher for air cooled systems.

The operating temperatures of third temperature stage generator $G_3$ are higher than temperatures currently used in double effect equipment. While direct fired high temperature generator heating may be more economical, occurrence of hot spots on the generator surface in contact with the absorption fluid are to be avoided to prevent corrosion acceleration and an increase in material incompatibility. Accordingly, indirect heating whereby burner flames are not in contact with the high temperature generator, such as using a phase change or pumped fluid loop, may be preferred. Moreover, regardless of the method of heating generator $G_3$, any remaining energy or sensible heat below $G_3$ temperature which is unavailable for heating generator $G_3$, is advantageously used for combustion air pre-heating, or, for being directed to one or both of the lower stage generators. Thus, if a pumped fluid loop is used to provide generator $G_3$ with energy, it may be combined with a pumped loop linking the lower generators and condensers, as previously described, or combined to link one of the communicating condenser/generator components, leaving the other generator/condenser set with an individual heat transfer loop. Moreover, although it is thermodynamically disadvantageous to operate a fluid loop at lower temperatures than necessary with heat transfer fluid reheating requirements using high second law availability heat, for example, gas combustion heat or high pressure steam, the aforesaid loop routing may simplify hardware needs and pump requirements and therefore have a cost advantage. Excess heat may also be used to provide hot water heating as commonly provided in current chiller-heater systems.

The absorber and evaporator portions of the systems of the invention may either be single or multiple units, respectively. The use of multiple evaporators and multiple absorbers as illustrated in the apparatus of FIGS. 3-8 is particularly advantageous if fluid crystallization limits endanger safe operation of the cycle in the liquid solution field. In the embodiments illustrated, the salt concentration increases as the temperature level increases. Thus, salt concentration of absorber $A_3$ is low compared to absorber $A_2$, which is also relatively low compared to absorber $A_1$. Likewise, the respective absorber operating temperatures are also higher in the higher concentration absorbers. Additionally, the evaporators are operated at different temperatures, with the highest temperature evaporator $E_1$ cooperating with absorber $A_1$ handling the highest absorbent concentration fluid, and similarly, the lower temperature evaporators accordingly communicating with the more dilute solution absorbers. Alternatively, the highest temperature evaporator may be paired with an absorber handling a lower concentration solution, and lower temperature evaporators communicating with the more concentrated solution absorbers provided such absorbers operate at a lower vapor pressure than the evaporator. The use of different evaporator temperatures, typically in the range of about 37° F. to 60° F., requires proper routing of the heat transfer fluid used to provide cooling to the load. For example, if a building is cooled with a cold water distribution system, often referred to as chilled water loop, the return flow heated by the building load first enters the highest temperature evaporator heat exchanger, and is then routed to successively lower temperature evaporators. Although the system of the invention incorporates up to three evaporators, other apparatus configurations using different absorber-/evaporator pairs may be used without increasing the number of generators by using more than one evaporator to communicate with a generator via one or more absorbers. However, excessive equipment costs may dictate a practical limit to be reached with two to three evaporator temperature levels. The systems shown may also be modified by providing direct flow between $C_1$ and either or both evaporators $E_2$ and $E_3$ rather than only with $E_1$. It may also be advantageous to operate multiple evaporators at substantially the same temperature if component location in the equipment is an important factor, which may be particularly advantageous in multi-zone buildings with substantially the same working temperature requirements. Moreover, the use of multiple absorbents is not limited to absorber operation with different absorbent concentrations or different operating pressures or different operating temperatures.

It will also be understood by those skilled in the art that for cost effective manufacturing, evaporator-absorber pairs may be incorporated in one shell or housing. Such pairing is especially useful for the lower two evaporator/absorber stages. If a stable or acceptable heat and mass transfer additive is used in all three stages, or adequate fluid handling means are used to prevent the additive from degenerating in the high stage generator or other means for preventing the additive from entering the high stage generator in substantial amounts, one or more absorbers may be used in a single shell or housing.

Because a single refrigerant, water, is used in the aqueous absorption fluids in the system of the present invention, a substantial variation in proportions of fluid flow between the generators and the one or more absorbers is available, with different flow selection options available depending on the operating conditions, loads and specific temperatures encountered. For example, the high temperature generator $G_3$ may generate sufficient refrigerant to condense at $C_3$ such that the latter can feed $G_2$ as well as portions of $G_1$ requirements. Moreover, if $C_3$ energy is insufficient to drive generator $G_2$ alone, flue gas from the combustion system, or heat transfer medium passing through generator $G_3$ exhaust may be used. Such configurations are understood to be only examples of different types of various design options and are not intended to limit the scope of the invention.

According to the invention, and as illustrated in the various triple effect systems shown schematically herein, the fluid loops for directing the aqueous absorption fluid between the one or more absorbers and the three generators may be combined in a number of different ways including series, parallel and reverse fluid flow. Thus, any one or more absorbers may feed more than one generator with the same fluid directed from the absorber or absorbers to the respective generator and with the flow sized for optimum thermal uptake efficiency. Typically, the mass or volume of flows from different absorbers to different generators are not even. Moreover, the fluid flow from a generator can be recombined with fluids from one or more other of the generators and fed into one or more absorbers. If the concentration of the fluids directed from different generators is different, such fluid recombination avoids the highest concentration from entering the lowest temperature absorber, or the only absorber in a single absorber system, thereby reducing the risk of crystallization of the fluid.

In describing the figures herein, as in Applicants' aforesaid application, the absorbers are designated as A, with first stage absorber $A_1$, second stage absorber $A_2$ and third stage absorber $A_3$, and the corresponding evaporators designated $E_1$, $E_2$ and $E_3$, respectively. Fluid loops between the various absorbers and generators are illustrated by the lines provided with arrows to show the fluid direction, and showing heat exchangers for transferring heat between the fluids passing to and from the generator illustrated. It will also be understood that the schematic illustrations are based on temperature-pressure relationships of the components within the system, and that the fluid loop lines do not represent concentrations of the aqueous absorption solutions within the fluid loops.

Figure 1:
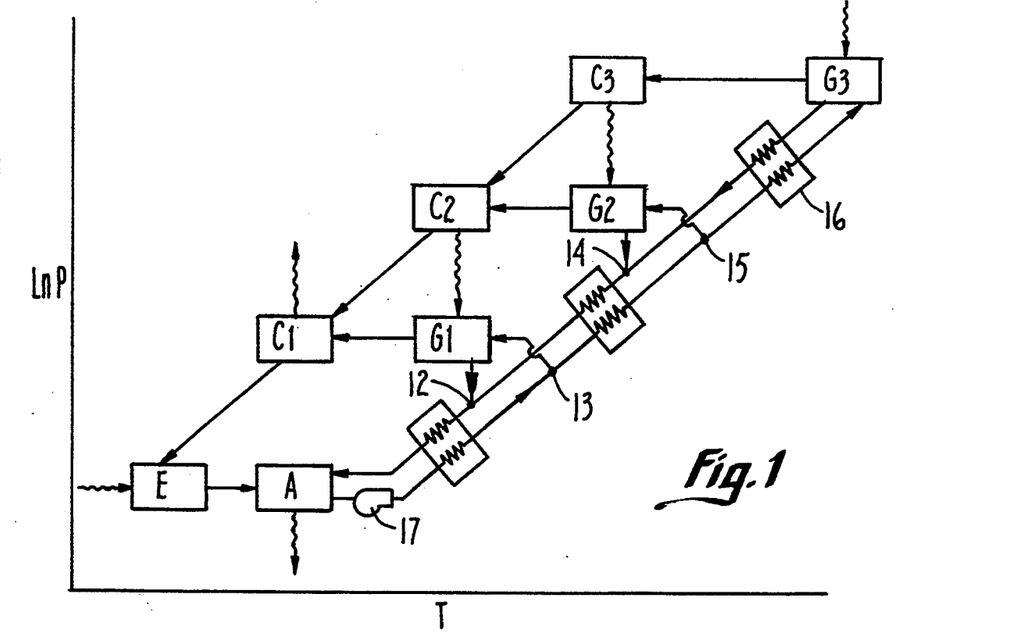
FIGS. 1 and 2 are schematic illustrations of triple effect cycles with parallel and reverse flow arrangements, respectively to all stages, and utilizing a single evaporator-absorber pair.
Figure 2:
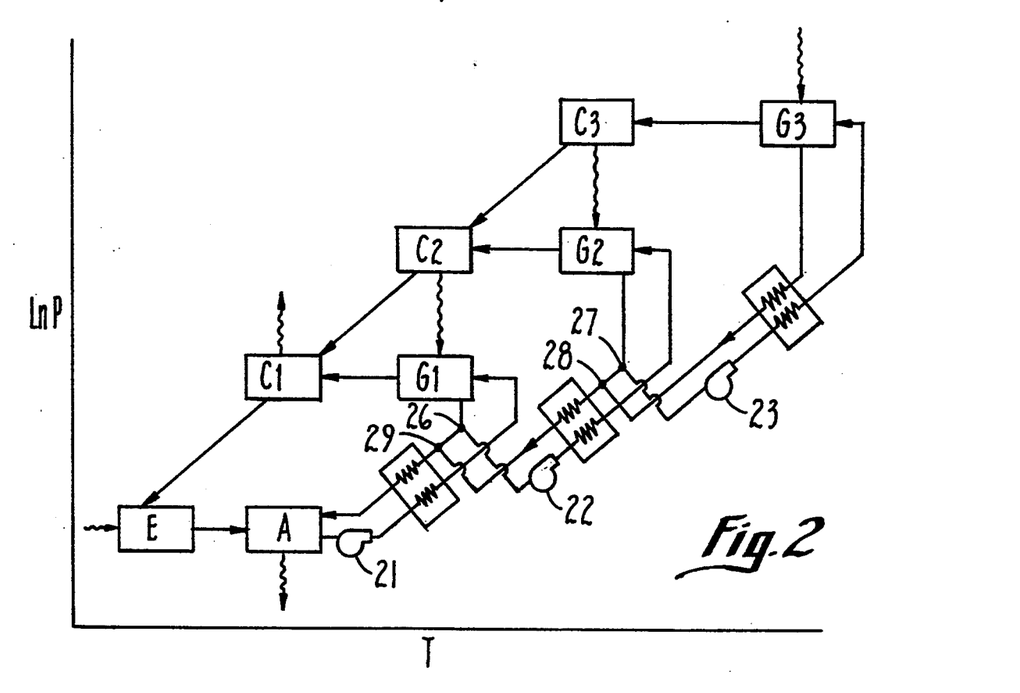
Figure 3:
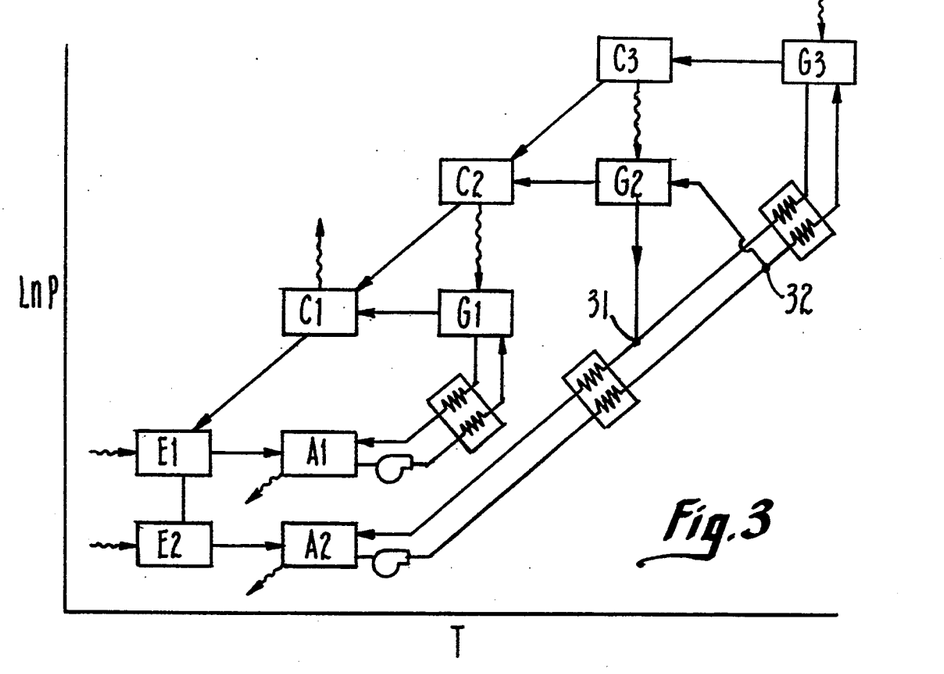
FIGS. 3–7 are schematic illustrations showing two absorber systems incorporating a number of different absorber/generator fluid loop combinations.

In FIGS. 1 and 2, triple effect cycles with parallel and reverse fluid loop flow arrangements, respectively, to all higher stage generators from a single absorber are shown. In FIG. 1, absorber A feeds all three stage generators, $G_1$, $G_2$ and $G_3$ in parallel. The schematically illustrated system includes flow splitting junctions 13 and 15 for directing the fluid pumped from absorber A via pump 17. In the return flow to the absorber from the generators, junctions 12 and 14 recombine the aqueous absorption fluid from generators $G_1$ and $G_2$, respectively, with fluid returning to the absorber from $G_3$. The system also illustrates the use of heat exchangers 16 located along the fluid loop for heat transfer between the fluid passing to and from the respective generators. Thus, in the system embodiment illustrated in FIG. 1, parallel flow to and from all generators along the fluid loop is illustrated.

In FIG. 2, fluid loops incorporating reverse flow embodiments are used in which flow splitting junctions for directing a portion of the aqueous absorption fluid flowing from a lower stage generator is pumped to a higher stage generator, and another portion of the fluid is directed back to the absorber. Specifically, in one fluid loop, the aqueous absorption fluid is pumped via pump 21 to first stage generator $G_1$ from which it flows to flow splitting junction 26 where it is divided into two portions, one portion pumped via pump 22 to second stage generator $G_2$, and another portion returned to the absorber A. Similarly, flow splitting junction 27 directs a first portion of the fluid from generator $G_2$ to generator $G_3$ via pump 23, and a second fluid portion is returned to absorber A. Return flow junctions 28 and 29 for recombining the fluid from the generators to absorber A are also shown. In the embodiments illustrated in FIGS. 1 and 2, utilizing a single absorber, it should also be understood that various combinations of parallel and reverse flows may be further combined with series flow fluid loop components as illustrated, for example, in FIGS. 7 and 8 of the aforesaid application Ser. No. 047,625.

In FIGS. 3–7, various embodiments of two absorbers triple effect systems according to the invention are schematically illustrated. The system shown in FIG. 3 uses parallel fluid loop fed from absorber $A_2$ to second and third stage generators $G_2$ and $G_3$ via feed splitting junction 32 and parallel return flow from the two higher stage generators recombining at junction 31. Absorber $A_1$ only feeds low stage generator $G_1$. The system shown could be also modified for series or reverse flow between absorber $A_2$ and generators $G_2$ and $G_3$.

Figure 4:
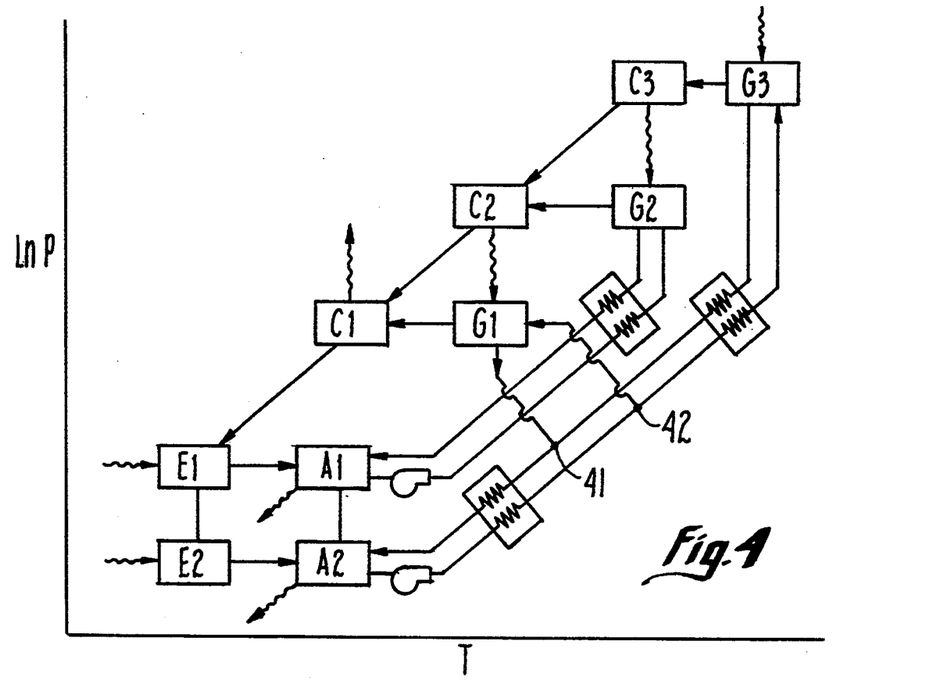

In FIG. 4, first and third stage generators $G_1$ and $G_3$ are fed in parallel by absorber $A_2$ while second stage generator $G_2$ is fed by absorber $A_1$. Flow splitting junction 42 for feeding generator $G_1$ and return flow junction 41 in the fluid loop between $A_2$ and generators $G_1$ and $G_3$ provide the parallel flow. Again, the system illustrated could be modified to provide for series or reverse flow between absorber $A_2$ and generators $G_1$ and $G_3$.

Figure 5:
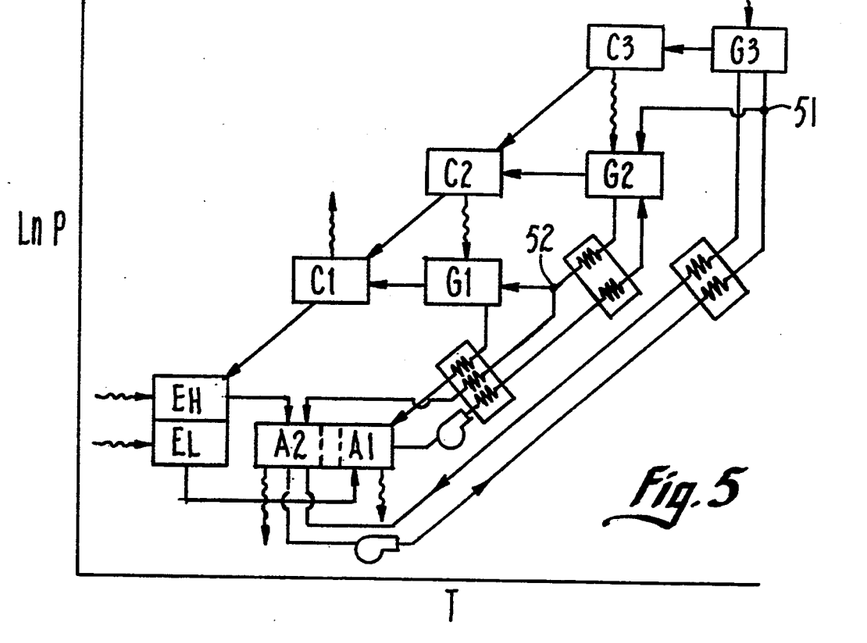

The system illustrated in FIG. 5 shows both absorbers feeding second stage generator $G_2$ while third stage generator $G_3$ is fed only by absorber $A_2$, and low stage generator fed only by absorber $A_1$ via generator $G_2$ and flow splitting junction 52, which also directs a second portion of aqueous absorption fluid from generator $G_2$ to absorber $A_2$. Thus, junctions 51 and 52 provide parallel flow of the fluid fed by absorber $A_1$ for return to both absorbers $A_1$ and $A_2$. Feed splitting junction 51 provides parallel flow to both generators $G_3$ and $G_2$. In the embodiment of FIG. 5, as well as FIGS. 6 and 7, the two absorbers have overlapping temperature ranges as illustrated by the dotted lines between the absorbers. The two evaporators shown are not typically in a single housing, but instead, each is usually combined in a single shell with the respective absorber as previously disclosed. This embodiment illustrates that the generators may be feed by more than one absorber, that the different generators may be fed by more than one absorber, and that the fluid loops may include a combination of series, parallel or reverse flow means.

Figure 6:
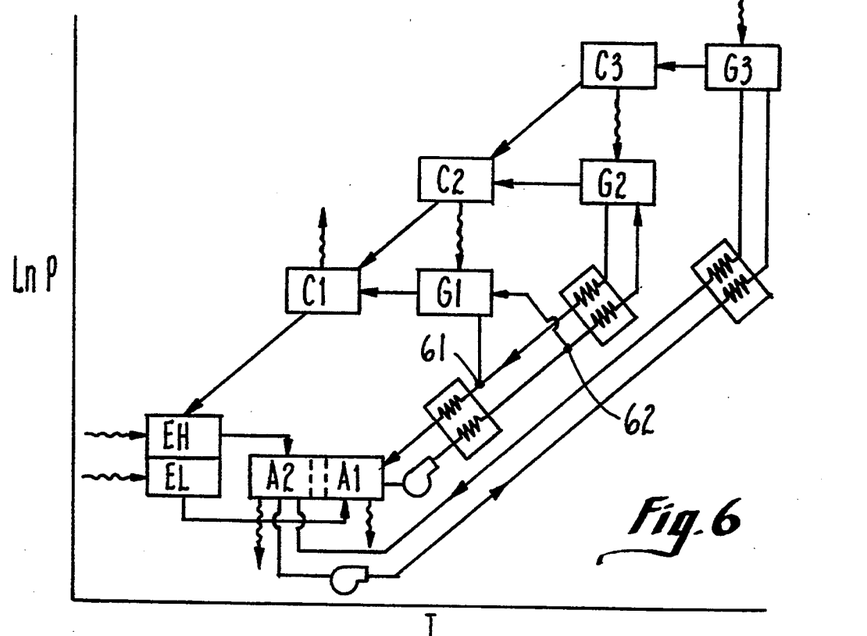
Figure 7:
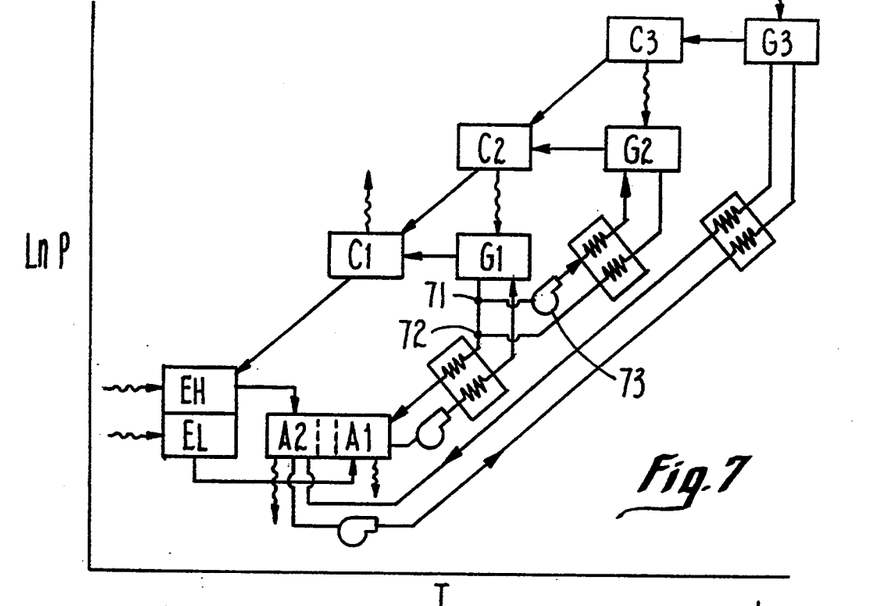

In FIGS. 6 and 7, high stage generator $G_3$ is fed solely by second stage absorber $A_2$, while first stage absorber $A_1$ feeds and receives fluid from both generators $G_1$ and $G_2$. In FIG. 6, feed splitting junction 62 provides for parallel feeding of the two lower stage generators and junction 61 provides parallel flow return to absorber $A_1$ from the two lower stage generators. In FIG. 7, generator $G_2$ is fed by reverse flow utilizing feed splitting junction 71 and pump 73 to feed a portion of a fluid leaving generator $G_1$ to feed $G_2$, while the return flows from the low stage generators are recombined at junction 72.

Figure 8:
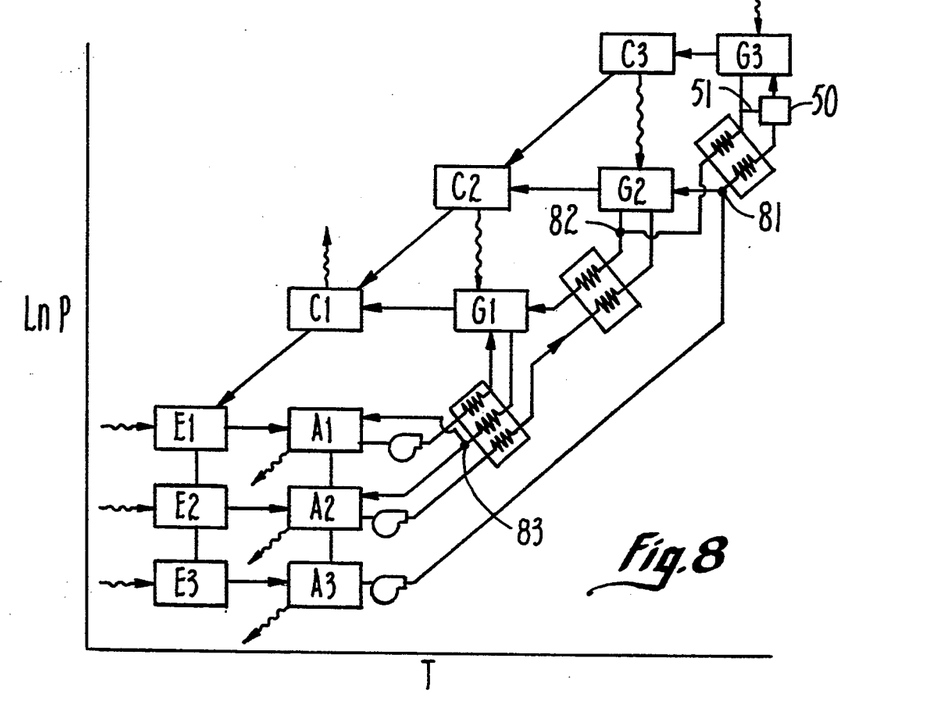
FIG. 8 schematically shows a three absorber system incorporating a combination or,parallel and series fluid loops.

FIG. 8 illustrates an embodiment of a three absorber system in which third stage absorber feeds both generators $G_2$ and $G_3$ via feed splitting junction 81 while absorber $A_2$ feeds generator $G_2$ and absorber $A_1$ feeds only generator $G_1$. The return flow from both $G_2$ and $G_3$ are combined at junction 82 and directed to generator $G_1$, and the fluid flow from $G_1$ is split to both absorbers $A_1$ and $A_2$ via junction 83. This system illustrates an example of diverse circuiting possible with a three absorber system with one or more generators communicating with multiple absorbers.

Solution heat exchange may be accomplished with conventional tube or plate heat exchangers and maximum efficiency reached by optimizing the temperature approach between entering and exiting solutions. It will be understood that in any of the system configurations within the invention, such a solution heat exchange between the generators and absorber or absorbers is to be used. If multiple absorption fluid loops are used, solution heat exchange may not be limited to heat exchange within each loop, but may incorporate energy exchange between different fluid loops. For example, high temperature fluid heats lower loop fluid after the higher temperature fluid performs its main function to preheat the medium temperature fluid. Excess heat may be available from cost driven design trade-offs in the solution heat exchangers as well as from the difference in specific heat capacity and mass flow between the concentrated and dilute refrigerant solutions entering or exiting the generators, respectively, as well as the exit generator temperatures.

As previously described, a single refrigerant, water, is used in the aqueous absorption fluid throughout the apparatus of the invention, regardless of the absorber-generator groupings or absorber fluid loop or loops and is used in all stages of the triple effect cycle carried out in the system. However, different salts or combination of salts, or different concentrations of the same salts, can be used in the different fluid loops. The aqueous absorption fluids which may be used in the present invention comprise aqueous solutions of LiBr, LiCl, LiI, $LiNO_2$, LiCNS, and $LiClO_3$ and mixtures thereof. Preferred fluid mixtures operating in the high stage generator comprise LiBr - LiCNS, LiBr - LiI, LiBr - $LiClO_3$, LiBr - $LiNO_2$, LiCl - LiI, LiCl - $LiNO_2$ and LiCl - $LiClO_3$. Other useful fluids are aqueous mixtures of one of the group LiBr, LiCl and LiI, together with a second salt of the group $Ni(NO_3)_2$, $CaBr_2$, $FeCl_2$ and $MnI_2$. Another useful salt group is $ZnBr_2$ combined with $CaBr_2$. Suitable concentrations of LiBr, LiCl or their mixtures are between about 58% and about 68%±2%, by weight, while in the third stage, a lower concentration of LiBr, about 55% or less, is used. The remaining salts may be used in any stage in concentrations of between about 40% up to about 75%. However, the high concentration will be limited by the salt crystallization limit. Yet another useful salt group comprises NaOH, KOH, or mixtures thereof. Suitable concentrations of about 40% up to the crystallization limit may be used, and where mixtures are used, relative proportions of between 40% and 60% NaOH and 60-40% KOH respectively, are preferred. Where LiBr, LiCl or mixtures thereof are used in stage one or in stages one and two, in stage three, a lower concentration of LiBr, or any of the other described salts or combinations are preferred.

Lithium corrosion inhibitors are especially useful with the aforesaid lithium salt compositions. Suitable corrosion inhibitors, include for example, lithium molybdate, lithium nitrate or lithium chromate. Ph adjustments may be made, for example, using LiOH. Because of the high temperatures and salt concentrations of the absorption fluids in the third stage generator it may be desirable to use corrosion resistant components or materials. Thus, for example, nickel-chromium alloys or nickel-copper or other non-ferrous alloys for construction of the high stage generator are preferred.

It is also desirable to use heat and mass transfer additives in the aqueous absorption fluids. Particularly useful additives include alcohols having between about 6 and about 10 carbon atoms, for example, 2-ethylhexanol and n-octanol. Aliphatic and aromatic amines such as nonylamine or benzylamine or its derivatives may also be used. Effective concentration ranges are from about 10 parts per million up to about 2000 ppm. It is desirable to separate the heat and mass transfer additive from the aqueous absorption fluid prior to entering the third stage generator. The heat and mass transfer additives are only slightly soluble or are insoluble in the aqueous salt solutions, and thus form a second phase, typically floating on the heavier aqueous solution highly desirable in the absorber(s). However, because these additives are not normally stable at high temperature generator temperatures, the use of a mechanical separator or skimmer, or other means for separating these heat and mass transfer additives prior to entry into the high temperature generator is desirable. Alternatively, such separation may be achieved by providing an accumulation chamber which avoids solution pumping from the surface where the heat and mass transfer additive collects. Another means for separating the additive is by use of a flash chamber in the lower temperature generator $G_2$, or in such a chamber located along the fluid loop prior to entering the high temperature generator. For example, by routing the absorption fluid such that it passes through generator $G_2$ prior to $G_3$, has the advantage that the heat and mass transfer additive can be easily flushed off from generator $G_2$. This option, however, does require an additional pump for pumping solution to generator $G_3$ which operates at higher pressure. Regardless of the type of separator used, it should preferably reduce the amount of additive present in the aqueous absorption fluid to about or substantially to the solubility limit of the additive. Means should also be provided for returning the separated additive into the fluid in or just prior to entry into the absorber. Thus, as shown in FIG. 8, the separator 50 may be provided with a return conduit 51 for supplying the additive separated from the fluid prior to entry into the high stage generator $G_3$ back to the loop after it leaves $G_3$.

Figure 9:
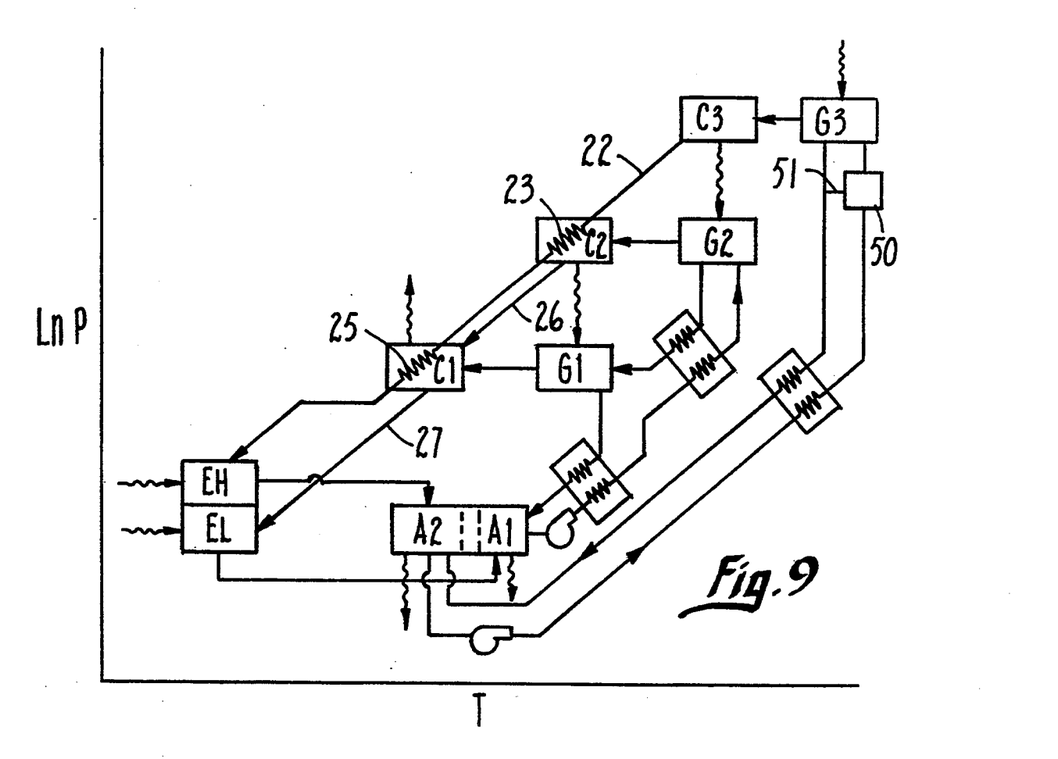
FIG. 9 is a schematic illustration of a triple effect system in which the high stage fluid loop is maintained in heat exchange communication with the two lower stage condensers of the system via heat exchange surfaces only.

FIG. 9 illustrates another embodiment of the invention which is particularly useful and advantageous where the highest stage of the triple effect system does not incorporate a heat and mass transfer additive in the aqueous absorption fluid used in the highest stage, or uses a different heat and mass transfer additive from that used in the lower stage fluids. In the system illustrated, the highest stage fluid loop between $E_h$-$A_2$-$G_3$-$C_3$ is limited to thermal communication, i.e., heat transfer communication with the lower condensers $C_2$ and $C_1$, and in which the high temperature evaporator $E_h$ and second stage absorber $A_2$ are not in physical communication with the other evaporator/absorber pairs. Specifically, as illustrated, the condensed refrigerant from $C_3$ directed along conduit 22 passes in heat transfer communication through heat exchanger 23 in condenser $C_2$ and heat exchanger 25 in condenser $C_1$ and is further directed into the evaporator/absorber pair $E_h$-$A_2$. In this manner, the aqueous absorption fluid loop in the highest temperature section is physically separated from the fluids in the lower stage loops thereby avoiding undesired transfer or mixing of heat and mass transfer additive from the low stages to the high stage. The condensate from condenser $C_2$ passes to condenser $C_1$ via conduit 26 and from $C_1$ to evaporator $E_l$ via conduit 27. Such a configuration is not limited to a two absorber/evaporator system, but may also be used in other configurations in which three absorbers are used with various evaporator combinations as previously described herein and in the aforesaid and incorporated copending application. In this embodiment, the use of an additive separator 50 may be optional.

It may also be desirable to incorporate a conventional purger in the system of the invention, for removing air or other non-condensable gases in the aqueous absorption fluid loop. Such equipment and its use in absorption systems is well known to those skilled in the art. The systems may also be designed using a heat and mass additive transfer reservoir and means for introducing the additive into the absorber(s). Because of gradual decomposition of the additive over time, means for periodically injecting a metered replacement amount of the additive to maintain suitable concentrations in the fluid in or prior to the absorber(s) will also be preferred. This requires that the heat and mass transfer additive decomposition products are purgable as is the case, for example, with 2-ethylhexanol.

Suitable heat transfer fluids used for heat transfer between components of the apparatus include water, heat transfer oil, Dowtherm ® fluids, water/glycol mixtures, etc. If the high temperature generator is steam fired, the condensate may be used for heating purposes at lower temperatures in the system.

The significant advantage of the cycle and system of the present invention is in the requirement of only a single refrigerant allowing for heat transfer and mass exchange coupling. The result is that no working fluid is required having an evaporator/absorber temperature lift of 130° F. from about 50° F. evaporator temperature to about 180° F. solution equilibrium temperature. Moreover, the lowest useful operating temperature will be lower than required in a dual loop cycle since the temperature spread required between condenser and generator is proportional to the spread between the evaporator and absorber. Moreover, the highest temperature stage portion of the present invention operates with conventional evaporator/absorber temperature lifts of between about 45° F. and about 90° F. and the highest stage condensing temperature needs only to be sufficient to drive the second stage generator, which could operate as low as 300° F. Such conditions lead to minimal generator temperature requirements for the third stage of between about 390° F. and 420° F., depending on operating conditions and heat exchange surfaces used, which is lower than expected for a dual loop triple effect system which is currently estimated to be between about 440° F. and 460° F. at the lowest. These as well as other advantages of the system will be evident to those skilled in the art.

We claim:

1. A triple effect absorption cycle apparatus, comprising:
   first, second and third generators each containing an aqueous absorption fluid and operating at successively higher temperatures, respectively;
   first, second and third condensers operating at successively higher temperatures, respectively, and operatively communicating with said first, second and third generators, respectively, and first condensate flow means for directing refrigerant condensed in said third condenser from said third condenser in heat exchange communication with one or more of said second and first condensers;
   first heat exchange means cooperating between said third condenser and said second generator, and between said second condenser and said first generator, for directing energy therebetween, respectively;
   one or more first absorbers cooperating with one or more first fluid loops for supplying aqueous absorption fluid to said first and second generators, and one or more second absorbers cooperating with one or more second fluid loops for supplying aqueous absorption fluid to said third generator;
   second heat exchange means cooperating with said fluid loops for exchanging energy between aqueous absorption fluid flows in said loops; and
   one or more evaporators operatively communicating with said absorbers.

2. The apparatus of claim 1 including second condensate flow means for directing refrigerant condensed in said second and said first condensers to one or more of said evaporators.

3. The apparatus of claim 1 comprising one or more first evaporators operatively communicating with one or more first absorbers, one or more second evaporators operatively communicating with said one or more second absorbers and wherein said first condensate flow means directs said refrigerant condensed in said third condenser to said one or more first evaporators.

4. The apparatus of claim 3 including second condensate flow means for directing refrigerant condensed in said second and said first condensers to said one or more second evaporators.

5. The apparatus of claim 1 wherein said first condensate flow means directs said refrigerant condensed in said third condenser in successive heat exchange communication with said second and said first condenser, respectively.

6. The apparatus of claim 4 wherein said first condensate flow means directs said refrigerant condensed in said third condenser in successive heat exchange communication with said second and said first condenser, respectively.

7. The apparatus of claim 4 wherein said second condensate flow means directs refrigerant condensed in said second condenser to said first condenser.

8. The apparatus of claim 1 wherein said aqueous absorption fluid in said one or more first absorbers comprises LiBr, LiCl or mixtures thereof, and wherein said aqueous absorption fluid in said one or more second absorbers comprises an aqueous solution of LiBr at a concentration of about 55% or less, or comprises an aqueous solution of one of the following groups of salts:
   (a) LiCl, LiNO$_2$, LiCNS, LiCiO$_3$, or LiI or mixtures of two or more of said salts;
   (b) LiBr, LiCl or LiI, and Ni (NO$_3$)$_2$, CaBr$_2$, FeCl$_2$ or MnI$_2$;
   (c) a mixture of ZnBr$_2$ and CaBr$_2$;
   (d) NaOH, KOH or mixtures thereof; or
   (e) mixtures of one or more of LiNO$_2$, LiCNS, LiClO$_3$, or LiI with LiBr, LiCl or mixtures thereof.

9. The apparatus of claim 7 wherein said aqueous absorption fluid in said one or more first absorbers comprises LiBr, LiCl or mixtures thereof, and wherein said aqueous absorption fluid in said one or more second absorbers comprises an aqueous solution of LiBr at a concentration of about 55% or less, or comprises an aqueous solution of one of the following groups of salts:
   (a) LiCl, LiNO$_2$, LiCNS, LiClO$_3$, of LiI, or mixtures of two or more of said salts;
   (b) LiBr, LiCl or LiI, and Ni (NO$_3$)$_2$, CaBr$_2$, FeCl$_2$ or MnI$_2$;
   (c) a mixture of ZnBr$_2$ and CaBr$_2$;
   (d) NaOH, KOH or mixtures thereof; or
   (e) mixtures of one or more of LiNO$_2$, LiCNS, LiClO$_3$, or LiI with LiBr, LiCl or mixtures thereof.

10. The apparatus of claim 1 wherein the aqueous absorption fluid supplied to said first and second generators comprises an aqueous composition of a first salt composition, and wherein the aqueous absorption fluid supplied to said third generator comprises an aqueous composition of a second salt composition.

11. The apparatus of claim 4 wherein the aqueous absorption fluid supplied to said first and second generators comprises an aqueous composition of a first salt composition, and wherein the aqueous absorption fluid supplied to said third generator comprises an aqueous composition of a second salt composition.

12. The apparatus of claim 1 wherein the aqueous absorption fluid supplied to said first and second generators comprises an aqueous solution of a salt composition having a first salt concentration in said one or more first absorbers and wherein the aqueous absorption fluid supplied to said third generator comprises an aqueous solution of said salt composition having a second salt concentration in said one or more second absorbers.

13. The apparatus of claim 4 wherein the aqueous absorption fluid supplied to said first and second generators comprises an aqueous solution of a salt composition having a first salt concentration in said one or more first absorbers and wherein the aqueous absorption fluid supplied to said third generator comprises an aqueous solution of said salt composition having a second salt concentration in said one or more second absorbers.

14. The apparatus of claim 1 wherein the aqueous absorption fluid supplied to said first and second generators contains a heat and mass transfer additive comprising an alcohol having between about 6 and about 10 carbon atoms, or an aliphatic or aromatic amine, and wherein the aqueous absorption fluid supplied to said third generator contains no heat and mass transfer additive or contains a different heat and mass transfer from the additive supplied to said first and second generators.

15. The apparatus of claim 4 wherein the aqueous absorption fluid supplied to said first and second generators contains a heat and mass transfer additive comprising an alcohol having between about 6 and about 10 carbon atoms, or an aliphatic or aromatic amine, and wherein the aqueous absorption fluid supplied to said third generator contains no heat and mass transfer additive or contains a different heat and mass transfer from the additive supplied to said first and second generators.

16. The apparatus of claim 1 wherein at least one of said first fluid loops is for directing aqueous absorption fluid in series flow between at least one of said first absorbers and said first and second generators.

17. The apparatus of claim 4 wherein at least one of said first fluid loops is for directing aqueous absorption fluid in series flow between at least one of said first absorbers and said first and second generators.

18. A triple effect absorption cycle apparatus, comprising:
first, second and third generators each containing an aqueous absorption fluid and operating at successively higher temperatures, respectively;
first, second and third condensers operating at successively higher temperatures, respectively, and operatively communicating with said first, second and third generators, respectively;
first heat exchange means cooperating between said third condenser and said second generator, and between said second condenser and said first generator, for directing energy therebetween, respectively;
one or two first absorbers and first fluid loops cooperating therewith for directing aqueous absorption fluid between said first absorbers and any one or more of said first and second generators, and a second absorber and a second fluid loop for directing aqueous absorption fluid between said second absorber and said third generator;
second heat exchange means cooperating with said fluid loops for exchanging energy between aqueous absorption fluid flows in said loops;
one or two first evaporators operatively communicating with said first absorbers, and a second evaporator operatively communicating with said second absorber; and
first condensate flow means for directing condensed refrigerant from said third condenser in successive heat exchange communication with said second and first condensers, respectively, to said second evaporator, and second condensate flow means for directing condensed refrigerant from said second and first condensers, respectively, to said first evaporators.

19. The apparatus of claim 18 wherein said second condensate flow means directs said condensate successively from said second condenser to said first condenser and to said first evaporators.

20. The apparatus of claim 18 wherein at least one of said first fluid loops is for directing aqueous absorption fluid in series flow between at least one of said first absorbers and said first and second generators.

21. A triple effect absorption cycle apparatus, comprising:
first, second and third generators each containing an aqueous absorption fluid and operating at successively higher temperatures, respectively;
first, second and third condensers operating at successively higher temperatures, respectively, and operatively communicating with said first, second and third generators, respectively;
first heat exchange means cooperating between said third condenser and said second generator, and between said second condenser and said first generator, for directing energy therebetween, respectively;
two or three absorbers and two or more fluid loops cooperating therewith for directing aqueous absorption fluid between said two or three absorbers and any one or more of said first, second and third generators, at least one of said fluid loops for directing said aqueous absorption fluid from at least one of said absorbers in parallel to a plurality of said generators or from at least one of said generators in parallel to a plurality of said absorbers;
second heat exchange means cooperating with said fluid loops for exchanging energy between aqueous absorption fluid flows in said loops; and
one, two or three evaporators operatively communicating with said two or three absorbers, respectively.

22. A triple effect absorption cycle apparatus, comprising:
first, second and third generators each containing an aqueous absorption fluid and operating at successively higher temperatures, respectively;
first, second and third condensers operating at successively higher temperatures, respectively, and operatively communicating with said first, second and third generators, respectively;
first heat exchange means cooperating between said third condenser and said second generator, and between said second condenser and said first generator, for directing energy therebetween, respectively;
one, two or three absorbers and one or more fluid loops cooperating therewith for directing aqueous absorption fluid between said one, two or three absorbers and any one or more of said first, second and third generators, at least one of said fluid loops for directing said aqueous absorption fluid from at least one of said absorbers to a plurality of said generators or from at least one of said generators to a plurality of said absorbers;
second heat exchange means cooperating with said fluid loops for exchanging energy between aqueous absorption fluid flows in said loops; and one, two or three evaporators operatively communicating with said one, two or three absorbers, respectively.

23. The apparatus of claim 22 wherein at least one of said fluid loops is for directing said aqueous absorption fluid from at least one of said absorbers in series flow to at least two of said generators.

24. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

two or three absorbers and two or more fluid loops cooperating therewith for directing aqueous absorption fluid between said two or three absorbers and any one or more of said first, second and third generators, at least one of said fluid loops for directing said aqueous absorption fluid from at least one of said absorbers to a plurality of said generators or from at least one of said generators to a plurality of said absorbers;

second heat exchange means cooperating with said fluid loops for exchanging energy between aqueous absorption fluid flows in said loops; and one, two or three evaporators operatively communicating with said two or three absorbers, respectively.

25. The apparatus of claim 24 wherein at least one of said fluid loops is for directing said aqueous absorption fluid from at least one of said absorbers in series flow to at least two of said generators.

26. The apparatus of claim 24 wherein at least one of said fluid loops is for directing said aqueous absorption fluid in parallel flow between at least one of said absorbers and at least two of said generators.

27. The apparatus of claim 24 wherein at least one of said fluid loops includes at least one flow splitting junction for directing a first portion of the aqueous absorption fluid from one of said generators to one of said absorbers and a second portion of said aqueous absorption fluid from said one generator to another of said generators.

28. The apparatus of claim 24 wherein at least one of said fluid loops includes at least one flow splitting junction for directing first and second portions of aqueous absorption fluid from one of said generators to different absorbers.

29. The apparatus of claim 27 wherein the mass or volume of first and second portions of flows of aqueous absorption fluid from a flow splitting junction are uneven.

30. The apparatus of claim 28 wherein the mass or volume of first and-second portions of flows of aqueous absorption fluid from a flow splitting junction are uneven.

31. The apparatus of claim 27 wherein at least one of said fluid loops includes at least one flow splitting junction for directing first and second portions of aqueous absorption fluid from one of said generators to different absorbers.

32. The apparatus of claim 23 comprising one absorber and wherein said fluid loops direct said aqueous absorption fluid in parallel flow from said absorber to each of said generators.

33. The apparatus of claim 23 comprising one absorber and wherein said fluid loops direct said aqueous absorption fluid in parallel flow from each of said generators to said absorber.

34. The apparatus of claim 32 wherein said fluid loops direct said aqueous absorption fluid in parallel flow from each of said generators to said absorber.

35. The apparatus of claim 23 comprising one absorber and wherein at least one of said fluid loops includes at least one flow splitting junction for directing a first portion of aqueous absorption fluid from one of said generators to said absorber and a second portion of said aqueous absorption fluid from said generator to one or more other of said generators.

36. The apparatus of claim 24 wherein at least one of said fluid loops is for directing said aqueous absorption fluid in parallel flow from an absorber to two of said generators.

37. The apparatus of claim 24 wherein at least one of said fluid loops is for directing said aqueous absorption fluid in parallel flow from two or three of said generators to one or more of said absorbers.

38. The apparatus of claim 36 wherein one of said fluid loops is for directing said aqueous absorption fluid in parallel flow from one of said absorbers to said second and third generators.

39. The apparatus of claim 36 wherein one of said fluid loops is for directing said aqueous absorption fluid in parallel flow from one of said absorbers to said first and third generators.

40. Apparatus of claim 36 wherein one of said fluid loops is for directing said aqueous absorption fluid in parallel flow from one of said absorbers to said first and second generators.

41. Apparatus of claim 36 wherein at least one of said fluid loops is for directing said aqueous absorption fluid in series flow between an absorber and at least two of said generators.

42. Apparatus of claim 40 wherein at least one of said fluid loops includes at least one flow splitting junction for directing a first portion of aqueous absorption fluid from one of said generators to an absorber and a second portion of said aqueous absorption fluid from said generator to one or more other of said generators.

43. Apparatus of claim 41 wherein at least one of said fluid loops includes at least one flow splitting junction for directing a first portion of aqueous absorption fluid from one of said generators to an absorber and a second portion of said aqueous absorption fluid from said generator to one or more other of said generators.

44. The apparatus of claim 38 comprising two absorbers and a first fluid loop for directing said aqueous absorption fluid between a first absorber and said first generator.

45. The apparatus of claim 44 comprising a second fluid loop for directing aqueous absorption fluid in parallel flow from said second and third generators to a second absorber.

46. The apparatus of claim 39 comprising two absorbers and a first fluid loop for directing aqueous absorption fluid between a first absorber and said second generator.

47. The apparatus of claim 46 comprising a second fluid loop for directing aqueous absorption fluid in parallel from said first and third generators to a second absorber.

48. The apparatus of claim 38 comprising two absorbers and a fluid loop for directing said aqueous absorption fluid in series flow from a first absorber to said first and second generators.

49. The apparatus of claim 48 comprising a fluid loop having a flow splitting junction for directing first and second portions of aqueous absorption fluid from said second generator to both absorbers.

50. The apparatus of claim 40 comprising two absorbers and a fluid loop for directing said aqueous absorption fluid between one of said absorbers and said third generator.

51. The apparatus of claim 22 comprising fluid loops for directing said aqueous absorption fluid in parallel flow from at least two of said absorbers to one of said generators.

52. The apparatus of claim 24 wherein,
said aqueous absorption fluid in each of said fluid loops, respectively, comprising an aqueous salt solution of one of the following groups of salts:
(a) $LiNO_2$, LiCNS, $LiClO_3$, or LiI or mixtures of two or more of said salts;
(b) LiBr, LiCl or LiI, and $Ni(NO_3)_2$, $CaBr_2$, $FeCl_2$ or $MnI_2$;
(c) a mixture of $ZnBr_2$ and $CaBr_2$,
(d) NaOH, KOH or mixtures thereof; or
(e) mixtures of one or more of $LiNO_2$, LiCNS, $LiClO_2$, or LiI with LiBr, LiCl or mixtures thereof.

53. Apparatus of claim 1 wherein at least one of said first fluid loops is for directing aqueous absorption fluid in parallel flow between at least one of said first absorbers and said first and second generators.

54. Apparatus of claim 1 wherein at least one of said first fluid loops includes at least one flow splitting junction for directing a first portion of said aqueous absorption fluid from a first or second generator to one of said first absorbers and a second portion of said aqueous fluid from said first or second generator to the other of said first and second generators.

55. The apparatus of claim 54 wherein the mass or volume of first and second portions of flows of aqueous absorption fluid from a flow splitting junction are uneven.

56. Apparatus of claim 1 wherein at least one of said first fluid loops includes at least one flow splitting junction for directing first and second portions of aqueous absorption fluid from at least one of said first and second generators to different first absorbers.

57. The apparatus of claim 56 wherein the mass or volume of first and second portions of flows of aqueous absorption fluid from a flow splitting junction are uneven.

58. Apparatus of claim 4 wherein at least one of said first fluid loops is for directing aqueous absorption fluid in parallel flow between at least one of said first absorbers and said first and second generators.

59. Apparatus of claim 4 wherein at least one of said first fluid loops includes at least one flow splitting junction for directing a first portion of said aqueous absorption fluid from a first or second generator to one of said first absorbers and a second portion of said aqueous fluid from said first or second generator to the other of said first and second generators.

60. Apparatus of claim 4 wherein at least one of said first fluid loops includes at least one flow splitting junction for directing first and second portions of aqueous absorption fluid from at least one of said first and second generators to different first absorbers.

61. Apparatus of claim 18 wherein at least one of said first fluid loops is for directing aqueous absorption fluid in parallel flow between at least one of said first absorbers and said first and second generators.

62. Apparatus of claim 18 wherein at least one of said first fluid loops includes at least one flow splitting junction for directing a first portion of said aqueous absorption fluid from a first or second generator to one of said first absorbers and a second portion of said aqueous fluid from said first or second generator to the other of said first and second generators.

63. Apparatus of claim 18 wherein at least one of said first fluid loops includes at least one flow splitting junction for directing first and second portions of aqueous absorption fluid from at least one of said first and second generators to different first absorbers.

* * * * *